US009691066B2

(12) United States Patent
McGuinness et al.

(10) Patent No.: US 9,691,066 B2
(45) Date of Patent: Jun. 27, 2017

(54) LOCATION-BASED PAYMENT SYSTEM AND METHOD

(75) Inventors: Brad McGuinness, Palm Harbor, FL (US); David Ezell, Tampa, FL (US); Paul Jannarone, Indian Rocks Beach, FL (US); Erik Vlugt, Rocklin, CA (US); Mike Thomas Roach, Tampa, FL (US)

(73) Assignee: VERIFONE, INC., San Jose, CA (US)

( * ) Notice: Subject to any disclaimer, the term of this patent is extended or adjusted under 35 U.S.C. 154(b) by 724 days.

(21) Appl. No.: 13/541,089

(22) Filed: Jul. 3, 2012

(65) Prior Publication Data

US 2014/0012688 A1    Jan. 9, 2014

(51) Int. Cl.
G06Q 20/00    (2012.01)
G06Q 20/40    (2012.01)
G06Q 20/32    (2012.01)
G06Q 20/20    (2012.01)

(52) U.S. Cl.
CPC ........... *G06Q 20/40* (2013.01); *G06Q 20/202* (2013.01); *G06Q 20/3224* (2013.01)

(58) Field of Classification Search
None
See application file for complete search history.

(56) References Cited

U.S. PATENT DOCUMENTS

| | | | |
|---|---|---|---|
| 3,466,643 A | 9/1969 | Moorefield | |
| 3,735,353 A | 5/1973 | Donovan et al. | |
| 4,275,378 A | 6/1981 | Henderson | |
| 4,486,637 A | 12/1984 | Chu | |
| 4,527,030 A | 7/1985 | Oelsch | |
| 4,593,384 A | 6/1986 | Kleijne | |
| 4,749,368 A | 6/1988 | Mouissie | |
| 4,807,284 A | 2/1989 | Kleijne | |
| 4,847,595 A | 7/1989 | Okamoto | |
| 5,086,292 A | 2/1992 | Johnson et al. | |

(Continued)

FOREIGN PATENT DOCUMENTS

| | | |
|---|---|---|
| CN | 101478400 | 7/2009 |
| CN | 101620705 | 1/2010 |

(Continued)

OTHER PUBLICATIONS

An Office Action dated Jul. 12, 2012, which issued during the prosecution of U.S. Appl. No. 11/465,479.

(Continued)

*Primary Examiner* — Fateh M Obaid
(74) *Attorney, Agent, or Firm* — Hunton & Williams LLP

(57) ABSTRACT

A virtual payment system including a customer-specific, customer geolocation responsive, limited time duration payment identifier generator operative to generate a customer-specific, customer geolocation responsive, limited time duration payment identifier, a customer-specific limited time duration payment identifier communicator operative to communicate the customer-specific, customer geolocation responsive, limited time duration payment identifier to a customer and a limited time duration payment identifier validator, operative to verify genuineness and timeliness of the customer-specific, customer geolocation responsive, limited time duration payment identifier presented by the customer at a point of sale.

5 Claims, 11 Drawing Sheets

(56) References Cited

U.S. PATENT DOCUMENTS

| | | |
|---|---|---|
| 5,237,307 A | 8/1993 | Gritton |
| 5,239,664 A | 8/1993 | Verrier et al. |
| 5,353,350 A | 10/1994 | Unsworth et al. |
| 5,371,798 A | 12/1994 | McWhortor |
| 5,426,360 A | 6/1995 | Maraio et al. |
| 5,506,566 A | 4/1996 | Oldfield et al. |
| 5,586,042 A | 12/1996 | Pisau et al. |
| 5,675,319 A | 10/1997 | Rivenberg et al. |
| 5,797,470 A | 8/1998 | Bohnert |
| 5,861,662 A | 1/1999 | Candelore |
| 5,877,547 A | 3/1999 | Rhelimi |
| 5,998,858 A | 12/1999 | Little et al. |
| 6,003,763 A | 12/1999 | Gallagher |
| 6,087,939 A | 7/2000 | Leyden et al. |
| 6,117,539 A | 9/2000 | Crotzer et al. |
| 6,288,640 B1 | 9/2001 | Gagnon |
| 6,359,338 B1 | 3/2002 | Takabayashi |
| 6,360,952 B1 | 3/2002 | Kimlinger |
| 6,396,400 B1 | 5/2002 | Epstein, III et al. |
| 6,414,884 B1 | 7/2002 | DeFelice et al. |
| 6,438,825 B1 | 8/2002 | Kuhn |
| 6,463,263 B1 | 10/2002 | Feilner et al. |
| 6,466,118 B1 | 10/2002 | Van Zeeland et al. |
| 6,633,241 B2 | 10/2003 | Kaikuranta et al. |
| 6,646,565 B1 | 11/2003 | Fu et al. |
| 6,830,182 B2 | 12/2004 | Izuyama |
| 6,853,093 B2 | 2/2005 | Cohen et al. |
| 6,874,092 B1 | 3/2005 | Motoyama et al. |
| 6,912,280 B2 | 6/2005 | Henry |
| 6,917,299 B2 | 7/2005 | Fu et al. |
| 6,921,988 B2 | 7/2005 | Moree |
| 6,936,777 B1 | 8/2005 | Kawakubo |
| 6,970,068 B1 | 11/2005 | Pugel et al. |
| 7,151,449 B2 | 12/2006 | Meijer |
| 7,170,409 B2 | 1/2007 | Ehrensvard et al. |
| 7,270,275 B1 | 9/2007 | Moreland et al. |
| 7,283,066 B2 | 10/2007 | Shipman |
| 7,351,919 B1 | 4/2008 | Knoke et al. |
| 7,392,388 B2 | 6/2008 | Keech |
| 7,431,202 B1 | 10/2008 | Meador |
| 7,497,378 B2 | 3/2009 | Aviv |
| 7,669,759 B1 | 3/2010 | Zettner |
| 7,784,691 B2 | 8/2010 | Mirkazemi-Moud et al. |
| 7,843,339 B2 | 11/2010 | Kirmayer |
| 7,898,413 B2 | 3/2011 | Hsu et al. |
| 8,220,047 B1 | 7/2012 | Soghoian |
| 8,438,066 B1* | 5/2013 | Yuen et al. .............. 705/21 |
| 8,775,814 B2* | 7/2014 | Bidare .............. 713/176 |
| 9,013,336 B2 | 4/2015 | Schulz et al. |
| 9,436,293 B2 | 9/2016 | Faoro |
| 2001/0027422 A1 | 10/2001 | Brandrud |
| 2002/0002683 A1 | 1/2002 | Benson |
| 2002/0004740 A1 | 1/2002 | Shotey |
| 2002/0063152 A1 | 5/2002 | Goodwin, III |
| 2002/0069162 A1 | 6/2002 | Boylan |
| 2002/0147646 A1 | 10/2002 | Ogura |
| 2002/0180584 A1 | 12/2002 | McGregor |
| 2002/0194081 A1 | 12/2002 | Perkowski |
| 2003/0009683 A1 | 1/2003 | Schwenck et al. |
| 2003/0025617 A1 | 2/2003 | Kunigkeit et al. |
| 2003/0047433 A1 | 3/2003 | Moree |
| 2004/0031673 A1 | 2/2004 | Levy |
| 2004/0073519 A1 | 4/2004 | Fast |
| 2004/0118670 A1 | 6/2004 | Park et al. |
| 2004/0120101 A1 | 6/2004 | Cohen et al. |
| 2004/0128197 A1* | 7/2004 | Bam et al. .............. 705/14 |
| 2005/0038787 A1 | 2/2005 | Cheung et al. |
| 2005/0081049 A1 | 4/2005 | Nakayama et al. |
| 2005/0133588 A1 | 6/2005 | Williams |
| 2005/0184870 A1 | 8/2005 | Galperin et al. |
| 2005/0210173 A1 | 9/2005 | Kehoe |
| 2006/0049255 A1 | 3/2006 | Mueller et al. |
| 2006/0049256 A1 | 3/2006 | Mueller et al. |
| 2006/0192653 A1 | 8/2006 | Atkinson et al. |
| 2006/0201701 A1 | 9/2006 | Coleman et al. |
| 2006/0293966 A1 | 12/2006 | Inouye |
| 2007/0016963 A1 | 1/2007 | Robinson |
| 2007/0040674 A1 | 2/2007 | Hsu |
| 2007/0084913 A1 | 4/2007 | Weston |
| 2007/0152042 A1 | 7/2007 | Mittler |
| 2007/0174115 A1 | 7/2007 | Chieu et al. |
| 2007/0174700 A1 | 7/2007 | Dalzell et al. |
| 2007/0204173 A1 | 8/2007 | Kuhn |
| 2007/0273522 A1 | 11/2007 | Dembro et al. |
| 2008/0103984 A1 | 5/2008 | Choe |
| 2008/0126251 A1 | 5/2008 | Wassingbo |
| 2008/0132118 A1 | 6/2008 | Dalzell et al. |
| 2008/0180245 A1 | 7/2008 | Hsu et al. |
| 2008/0208748 A1 | 8/2008 | Ozment |
| 2008/0278353 A1 | 11/2008 | Smith et al. |
| 2008/0290987 A1 | 11/2008 | Li |
| 2009/0068628 A1 | 3/2009 | Martino |
| 2009/0184850 A1 | 7/2009 | Schulz et al. |
| 2009/0276358 A1 | 11/2009 | Dutta |
| 2009/0327134 A1 | 12/2009 | Carlson |
| 2010/0082241 A1 | 4/2010 | Trivedi |
| 2010/0153184 A1* | 6/2010 | Caffrey et al. .............. 705/10 |
| 2010/0181999 A1 | 7/2010 | Sudai et al. |
| 2011/0035318 A1 | 2/2011 | Hargrove |
| 2011/0047075 A1* | 2/2011 | Fourez .............. 705/44 |
| 2011/0063109 A1 | 3/2011 | Ostermoller |
| 2011/0076941 A1 | 3/2011 | Taveau |
| 2011/0082767 A1 | 4/2011 | Ryu |
| 2011/0093326 A1 | 4/2011 | Bous |
| 2011/0093344 A1 | 4/2011 | Burke et al. |
| 2011/0153437 A1 | 6/2011 | Archer |
| 2011/0176705 A1* | 7/2011 | Kato .............. 382/100 |
| 2011/0191184 A1 | 8/2011 | Blackhurst et al. |
| 2011/0191236 A1 | 8/2011 | Cummings |
| 2011/0231315 A1 | 9/2011 | Bandyopadhyay |
| 2011/0248860 A1 | 10/2011 | Avital et al. |
| 2011/0279279 A1 | 11/2011 | Mirkazemi-Moud et al. |
| 2012/0066081 A1* | 3/2012 | Shader et al. .............. 705/18 |
| 2012/0076301 A1 | 3/2012 | Kanter |
| 2012/0105230 A1 | 5/2012 | Bockstoce |
| 2012/0106113 A1 | 5/2012 | Kirmayer |
| 2012/0209773 A1* | 8/2012 | Ranganathan .............. 705/44 |
| 2012/0239504 A1 | 9/2012 | Curlander et al. |
| 2013/0030931 A1* | 1/2013 | Moshfeghi .............. 705/16 |
| 2013/0275303 A1* | 10/2013 | Fiore et al. .............. 705/44 |
| 2013/0306450 A1 | 11/2013 | Wolfe et al. |
| 2015/0185864 A1 | 7/2015 | Faoro |

FOREIGN PATENT DOCUMENTS

| | | |
|---|---|---|
| CN | 102130892 | 7/2011 |
| CN | 102147900 | 8/2011 |
| DE | 2241738 | 3/1973 |
| DE | 60 101 096 | 7/2004 |
| EP | 0375545 | 6/1990 |
| EP | 1421549 | 5/2004 |
| EP | 1432031 | 6/2004 |
| EP | 1676182 | 7/2006 |
| GB | 892198 | 3/1962 |
| GB | 1369739 | 10/1974 |
| GB | 2178235 | 2/1987 |
| GB | 2353401 | 2/2001 |
| GB | 2372363 | 8/2002 |
| GB | 2411756 | 9/2006 |
| JP | 2002-108711 | 4/2002 |
| JP | 2002288744 | 10/2002 |
| JP | 2003150883 | 5/2003 |
| KR | 20040021425 | 3/2004 |
| KR | 20080009242 | 1/2008 |
| WO | 01/63994 | 8/2001 |
| WO | 03007542 | 1/2003 |
| WO | 2004079499 | 9/2004 |
| WO | 2005071988 | 8/2005 |

(56) References Cited

FOREIGN PATENT DOCUMENTS

| | | |
|---|---|---|
| WO | 2005/086546 | 9/2005 |
| WO | 2010/082190 | 7/2010 |

OTHER PUBLICATIONS

An International Search Report and a Written Opinion both dated Sep. 4, 2012, which issued during the prosecution of Applicant's PCT/IL2012/000171.
An Office Action dated Feb. 1, 2016, which issued during the prosecution of U.S. Appl. No. 13/774,187.
Office Action dated May 28, 2004, which issued during the prosecution of U.S. Appl. No. 10/326,726.
International Search Report and a Written Opinion both dated Apr. 30, 2012, which issued during the prosecution of Applicant's PCT/US2012/020142.
Kremin, et al., "Capacitive sensing—waterproof capacitance sensing", Cypress Perform, Dec. 2006.
Office Action dated Jul. 11, 2014, which issued during the prosecution of U.S. Appl. No. 12/355,857.
Van Ess, Dave; "Capacitive touch switches for automotive applications", http://www.automotivedesignline.com/, Feb. 2006.
Office Action dated Apr. 10, 2012, which issued during the prosecution of U.S. Appl. No. 12/758,150.
Office Action dated May 13, 2010, which issued during the prosecution of Applicant's U.S. Appl. No. 11/845,435.
Notice of Allowance dated Sep. 10, 2010, which issued during the prosecution of Applicant's U.S. Appl. No. 11/845,435.
International Preliminary Report on Patentability dated Jul. 19, 2011, which issued during the prosecution of Applicant's PCT/IL2009/000724.
Notice of Allowance dated Dec. 19, 2014, which issued during the prosecution of U.S. Appl. No. 12/355,857.
U.S. Appl. No. 61/011,993, filed Jan. 22, 2008.
Office Action dated May 11, 2012, which issued during the prosecution of U.S. Appl. No. 12/355,857.
Office Action dated Oct. 16, 2012, which issued during the prosecution of U.S. Appl. No. 12/355,857.
Supplementary European Search Report dated Nov. 7, 2013, which issued during the prosecution of Applicant's European App No. 07869932.9.
Office Action dated Jul. 8, 2015, which issued during the prosecution of U.S. Appl. No. 14/658,847.
Office Action dated Jan. 7, 2016, which issued during the prosecution of U.S. Appl. No. 14/658,847.
Notice of Allowance dated May 12, 2016, which issued during the prosecution of U.S. Appl. No. 14/658,847.
International Search Report and a Written Opinion both dated Feb. 2, 2016, which issued during the prosecution of Applicant's PCT/US2015/059891.
Office Action dated Oct. 2, 2015, which issued during the prosecution of U.S. Appl. No. 14/506,044.
Office Action dated Oct. 26, 2004, which issued during the prosecution of U.S. Appl. No. 10/326,726.
An Office Action dated Jan. 13, 2015, which issued during the prosecution of U.S. Appl. No. 14/153,348.
An Office Action dated Dec. 29, 2014, which issued during the prosecution of U.S. Appl. No. 13/774,187.
An Office Action dated Sep. 11, 2015, which issued during the prosecution of U.S. Appl. No. 13/774,187.

\* cited by examiner

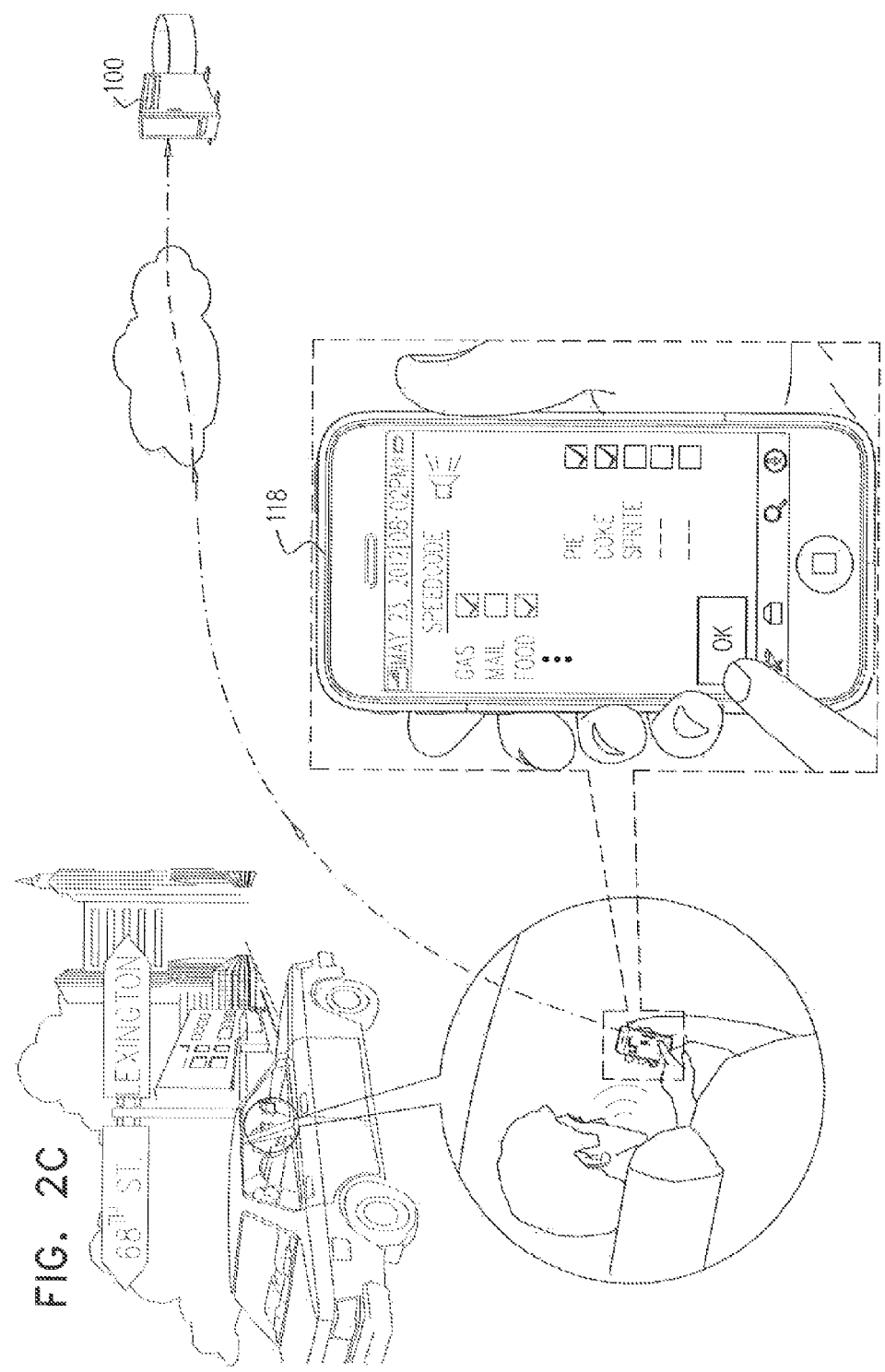

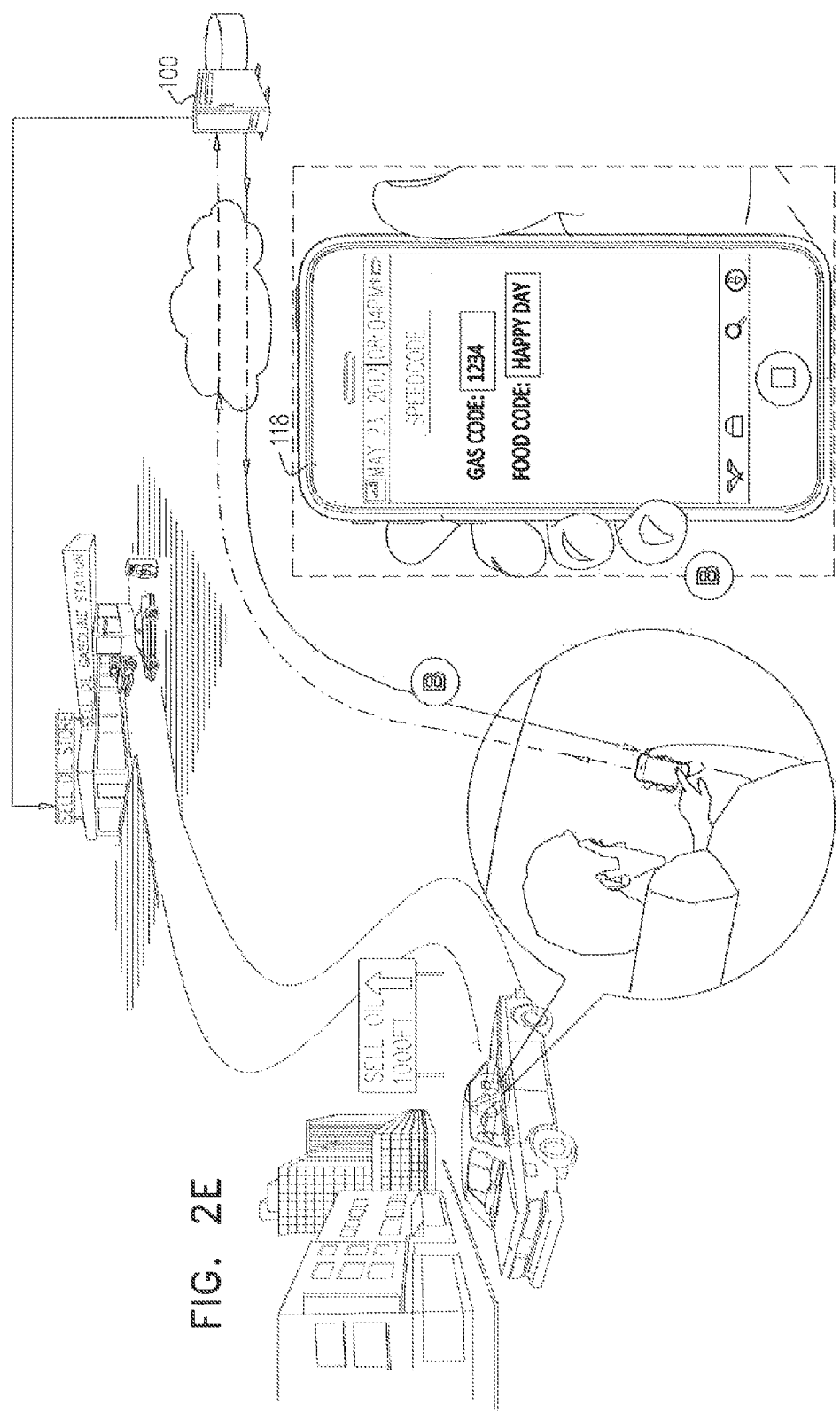

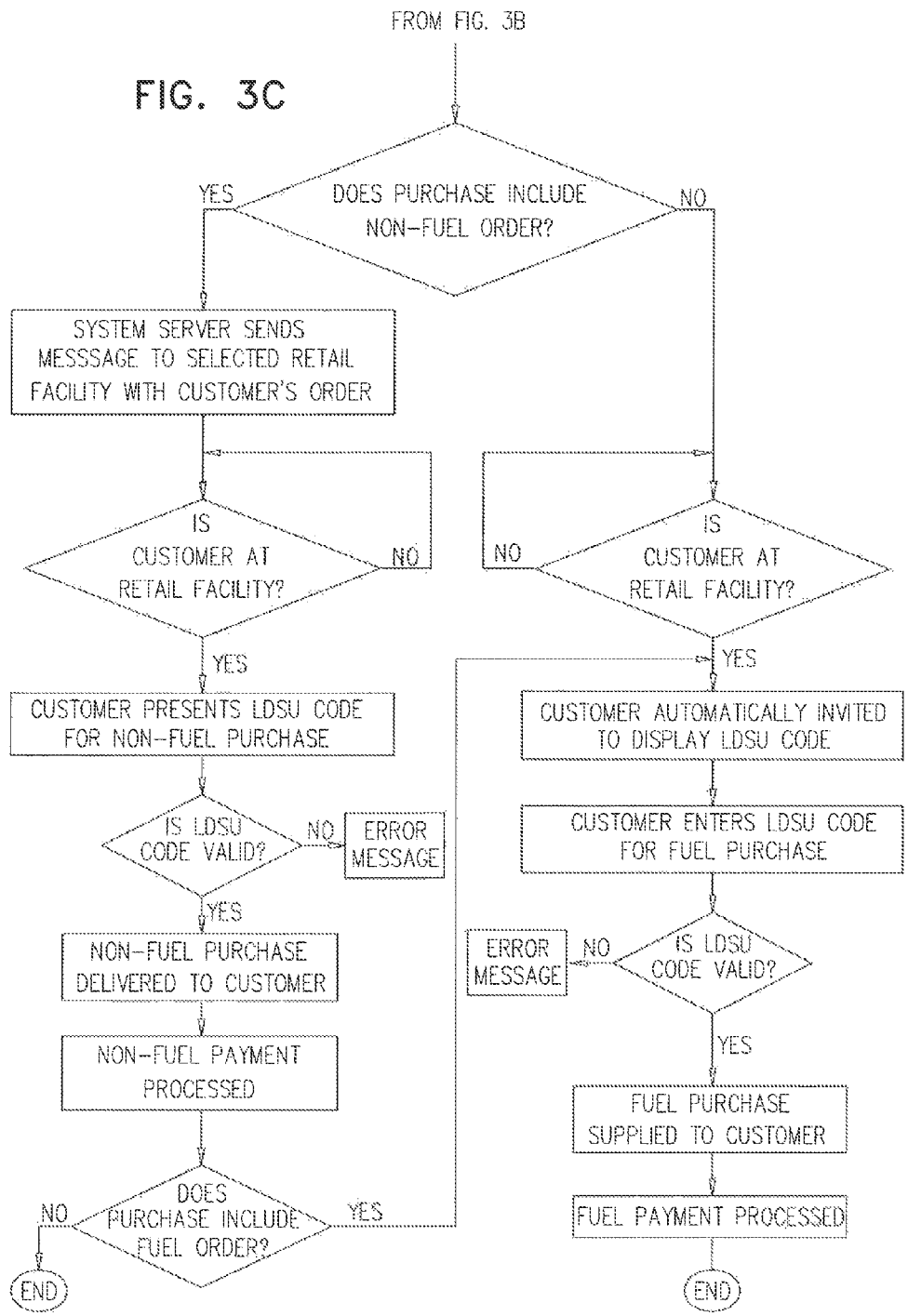

LOCATION-BASED PAYMENT SYSTEM AND METHOD

FIELD OF THE INVENTION

The present invention relates to payment systems and methodologies generally.

BACKGROUND OF THE INVENTION

Computerized payment systems have been developed to facilitate purchases of goods and services. Such payment systems are typically deployed at points of sale such as retail stores and gas stations.

SUMMARY OF THE INVENTION

The present invention seeks to provide improved payment systems and methodologies. There is thus provided in accordance with a preferred embodiment of the present invention a virtual payment system including a customer-specific, customer geolocation responsive, limited time duration payment identifier generator operative to generate a customer-specific, customer geolocation responsive, limited time duration payment identifier, a customer-specific limited time duration payment identifier communicator operative to communicate the customer-specific, customer geolocation responsive, limited time duration payment identifier to a customer and a limited time duration payment identifier validator, operative to verify genuineness and timeliness of the customer-specific, customer geolocation responsive, limited time duration payment identifier presented by the customer at a point of sale.

Preferably, the customer-specific, customer geolocation responsive, limited time duration payment identifier is also operative as a purchase identifier.

In accordance with a preferred embodiment of the present invention the virtual payment system also includes a point of sale (POS) device cooperating with the limited time duration payment identifier validator. Additionally, the limited time duration payment identifier validator is located at the POS device. Alternatively, the limited time duration payment identifier validator is remotely located from the POS device.

Preferably, the customer-specific, geolocation responsive, limited time duration payment identifier generator is located at the POS device. Alternatively, the customer geolocation responsive, limited time duration payment identifier generator is remotely located from the POS device.

In accordance with a preferred embodiment of the present invention the limited time duration payment identifier is valid at a single point of sale. Alternatively, the limited time duration payment identifier is valid at multiple points of sale within a geolocation-determined range of the customer.

Preferably, the limited time duration payment identifier is valid for a geolocation-determined time which is a function of travel time between a location of the customer and the point of sale.

There is also provided in accordance with another preferred embodiment of the present invention a virtual payment method including generating a customer geolocation responsive, limited time duration payment identifier, communicating the limited time duration payment identifier to a customer and verifying correctness and timeliness of the limited time duration payment identifier presented by the customer at a point of sale.

Preferably, the customer-specific, customer geolocation responsive, limited time duration payment identifier is also operative as a purchase identifier.

In accordance with a preferred embodiment of the present invention the verifying includes verifying at the point of sale. Alternatively, the verifying includes verifying at a location remote from the point of sale.

Preferably, the generating includes generating at the point of sale. Alternatively, the generating includes generating at a location remote from the point of sale.

In accordance with a preferred embodiment of the present invention the limited time duration payment identifier is valid at a single point of sale. Alternatively, the limited time duration payment identifier is valid at multiple points of sale within a geolocation-determined range of the customer.

Preferably, the limited time duration payment identifier is valid for a geolocation-determined time which is a function of travel time between a location of the customer and the point of sale.

BRIEF DESCRIPTION OF THE DRAWINGS

The present invention will be understood and appreciated more fully from the following detailed description, taken in conjunction with the drawings in which:

FIGS. 2A-2G are together a simplified illustration of the structure and operation of a payment system constructed and operative in accordance with a preferred embodiment of the present invention; and FIGS. 3A-3C are together a simplified flowchart illustrating operation of the methodology of a preferred embodiment of the present invention.

DETAILED DESCRIPTION OF A PREFERRED EMBODIMENT

Figure 1:
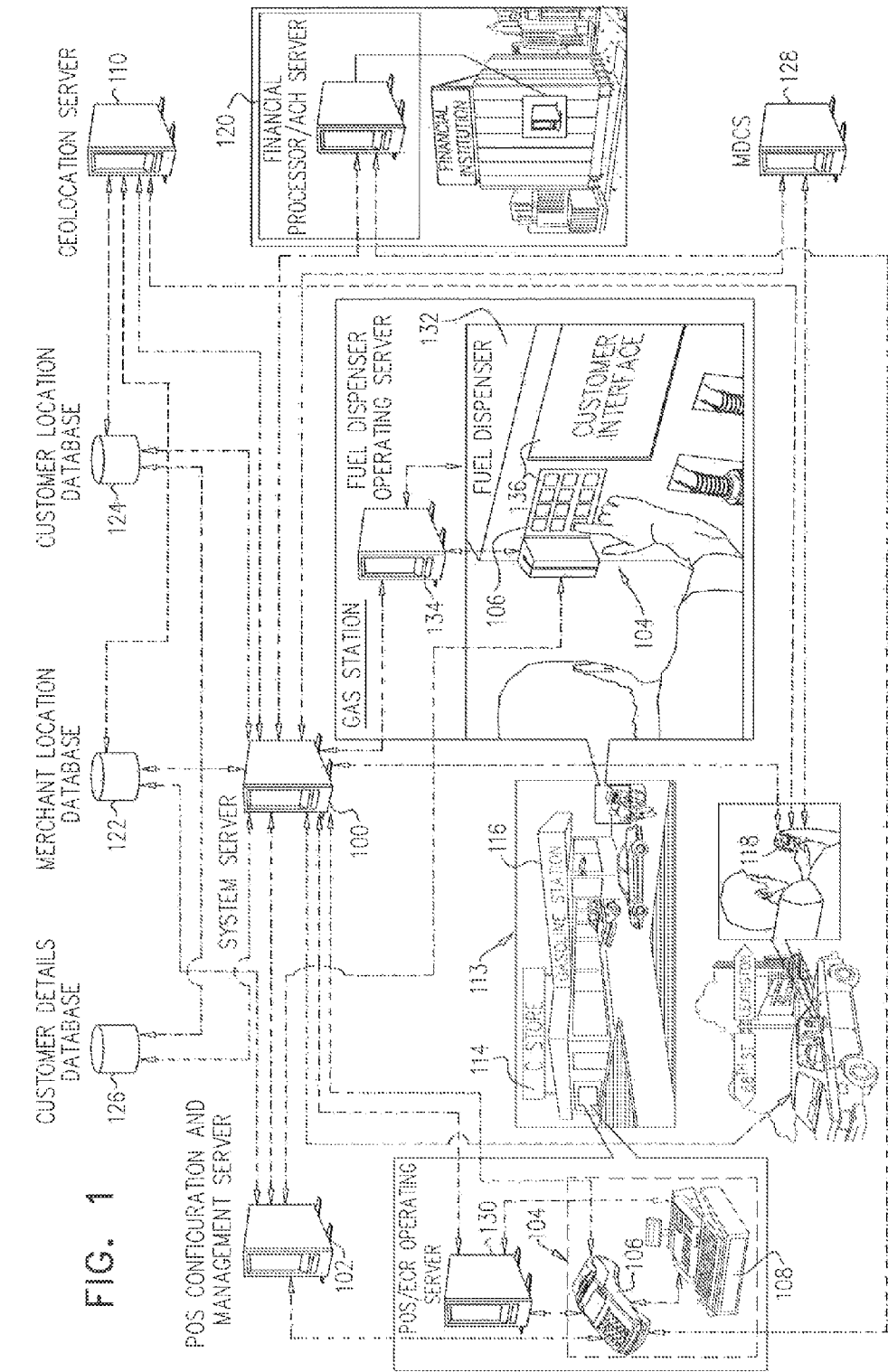
FIG. 1 is a simplified functional block diagram of a payment system constructed and operative in accordance with a preferred embodiment of the present invention.

Reference is now made to FIG. 1, which is a simplified functional block diagram of a payment system constructed and operative in accordance with a preferred embodiment of the present invention. As seen in FIG. 1, the payment system preferably includes a system server 100, here also termed a "SPEEDCODE" server, which preferably manages the payment system. The system server 100 preferably cooperates with at least one POS configuration and management server 102, such as a VERIX® configuration server commercially available from Verifone, Inc. The at least one POS configuration and management server 102 is operative for configuring a plurality of point of sale (POS) devices 104, which are located at business premises, such as convenience stores, and are incorporated into gasoline dispensers, which may be adjunct to the convenience stores. POS devices 104 may include, for example, payment terminals 106, commercially available from Verifone, Inc., such as a VERIFONE® model MX® 915, connected to an electronic cash register (ECR) 108. More generally, the POS devices 104 may include one or more of ECRs, payment terminals, pin pads, and readers, which may be fully or partially integrated and/or interconnected. The payment system of the present invention may be used to purchase any suitable goods or services.

The system server 100 preferably interfaces directly or indirectly with a geolocation server 110 which may be cellular-based and/or GPS based. Geolocation server 110 may provide location data for fixed locations 113, such as convenience stores 114 and gas stations 116, as well as current location data for a plurality of mobile devices which may be in motion, such as vehicles and hand-held mobile communicators 118. Geolocation server 110 may also provide navigation instructions leading a customer from his current location to a selected fixed location 113, such as one of convenience stores 114 and gas stations 116. Geolocation server 110 may communicate directly with system server 100 or via a SPEEDCODE application resident on a customer mobile communicator 118.

The system server 100 preferably interfaces with one or more financial transaction processor servers 120, which in turn communicate with financial institutions such as banks, credit card companies and PAYPAL®.

The system server 100 and/or the geolocation server 110 preferably also interface with one or more merchant location databases 122 which permit merchant locations to be accessed via merchant identifiers known to POS configuration and management server 102.

The system server 100 preferably also interfaces with one or more customer location databases 124, which permit current customer locations to be accessed by the geolocation server 110 via customer identifiers known to the system server 100. A typical customer identifier may be the customer's mobile telephone number or the Temporary Mobile Subscriber Identity (TMSI).

The system server 100 preferably also interfaces with a customer details database 126 which preferably includes, inter alia, a customer vehicle license plate number. Database 126 enables a customer vehicle license plate number to be accessed by the system server 100 via customer identifiers known to the system server 100.

The system typically also includes at least one mobile device configuration server (MDCS) 128, such as Apple App Store or the Android Playstore or a Trusted Secure Manager (TSM) server, commercially available from Gemalto NV, operative for configuring the plurality of mobile devices and downloading applications to the mobile communicator 118. System server 100 may include this functionality or may communicate with MDCS server 128.

Typically, POS devices 104 interface with a POS/ECR operating server 130, such as a Retail 360 server commercially available from Verifone, Inc., which may also manage, for example, inventory, sales and promotions. System server 100 may interface with some or all of the various POS devices 104, particularly ECRs 108, via POS/ECR operating server 130. Alternatively, the system server 100 may interface directly with the individual POS devices 104. Preferably, system server 100 interfaces with payment terminals 106 via POS configuration server 102. Payment terminals 106 are typically in communication with financial transaction processor servers 120.

It is appreciated that payment terminals 106, ECRs 108, POS configuration and management servers 102, POS/ECR operating server 130 and system server 100 are typically not under common management control. Merchants and various store operators typically control POS/ECR operating server 130. Payment terminals 106 and POS configuration and management servers 102 are typically controlled by POS device manufacturers and financial institutions. It is also appreciated that POS configuration and management servers 102 and POS/ECR operating servers 130 may be embodied in a single server. It is also appreciated that system server 100 may incorporate the functionalities of POS configuration and management servers 102 and POS/ECR operating servers 130.

Typically, fuel dispensers 132 at gasoline stations 116 interface with a fuel dispenser operating server 134. In such a case the system server 100 may interface with the various fuel dispensers 132 via the fuel dispenser operating server 134. Preferably, fuel dispensers 132 include a payment terminal 106 and a customer interface device 136, which typically includes one or more of a keyboard or keypad, a camera, a NFC device and a display. Preferably, system server 100 may interface with payment terminal 106 via POS configuration and management server 102 and with fuel dispenser 132 and customer interface device 136 via fuel dispenser operating server 134.

Figure 2A:
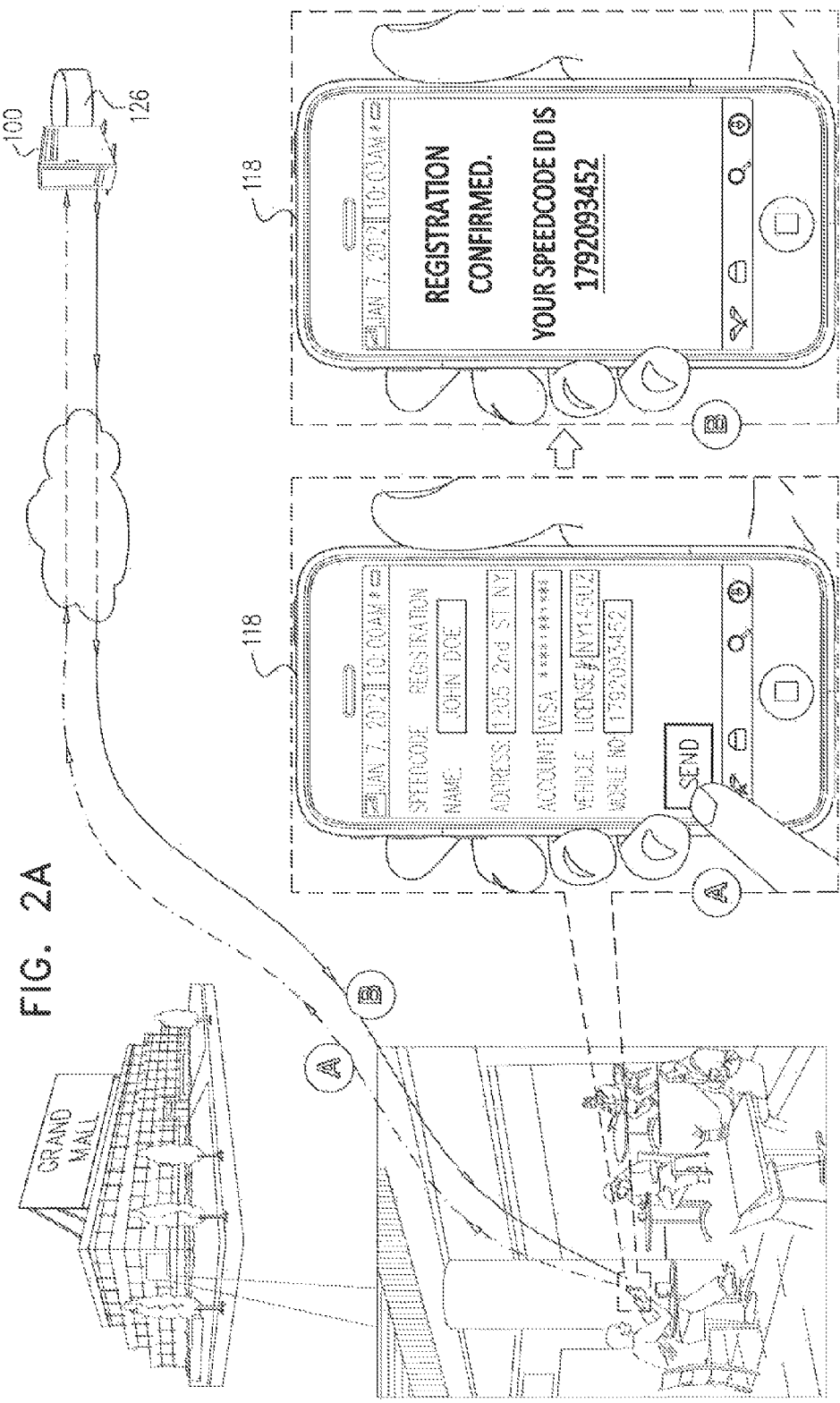
Figure 2B:
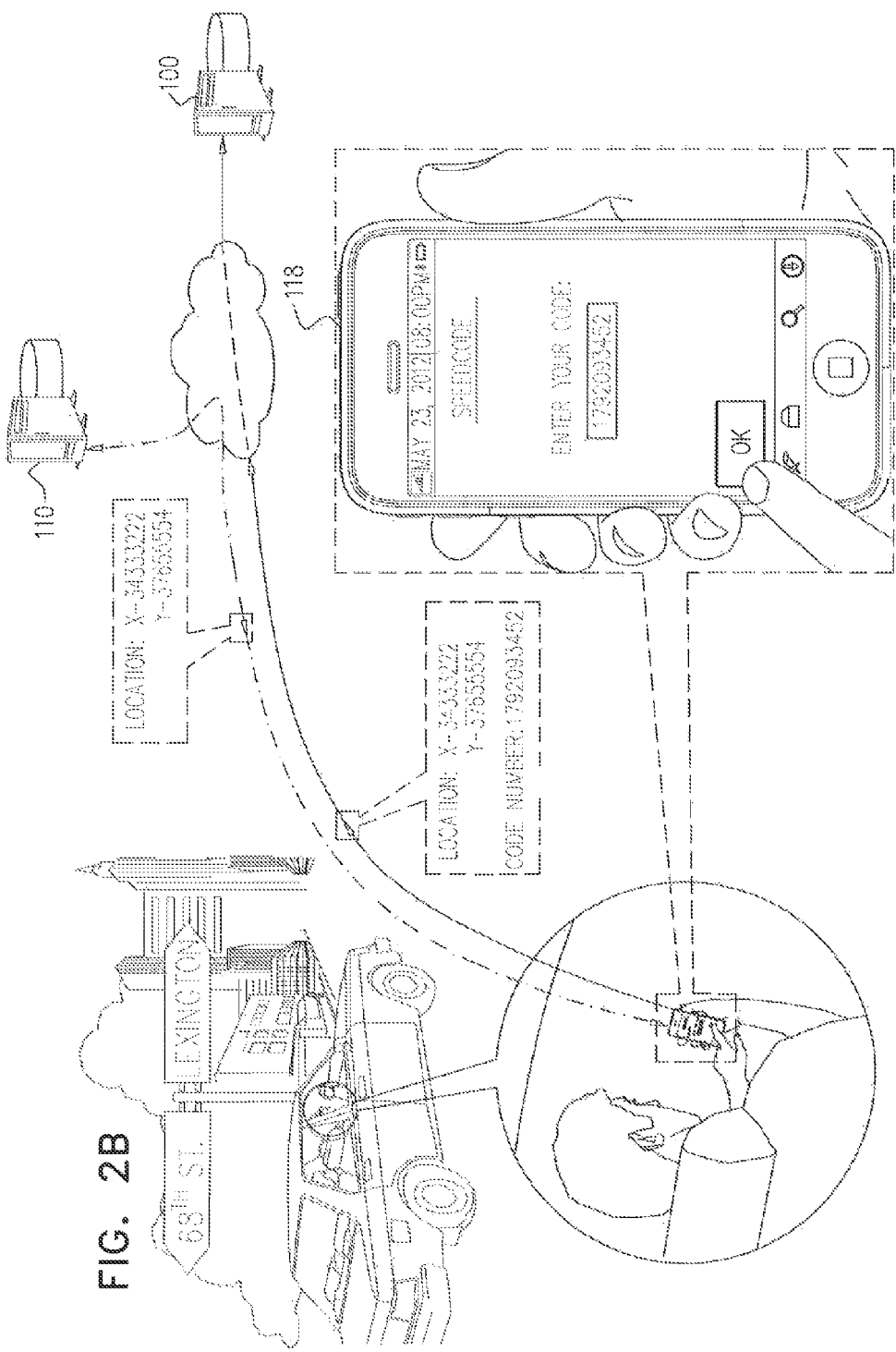
Figure 2D:
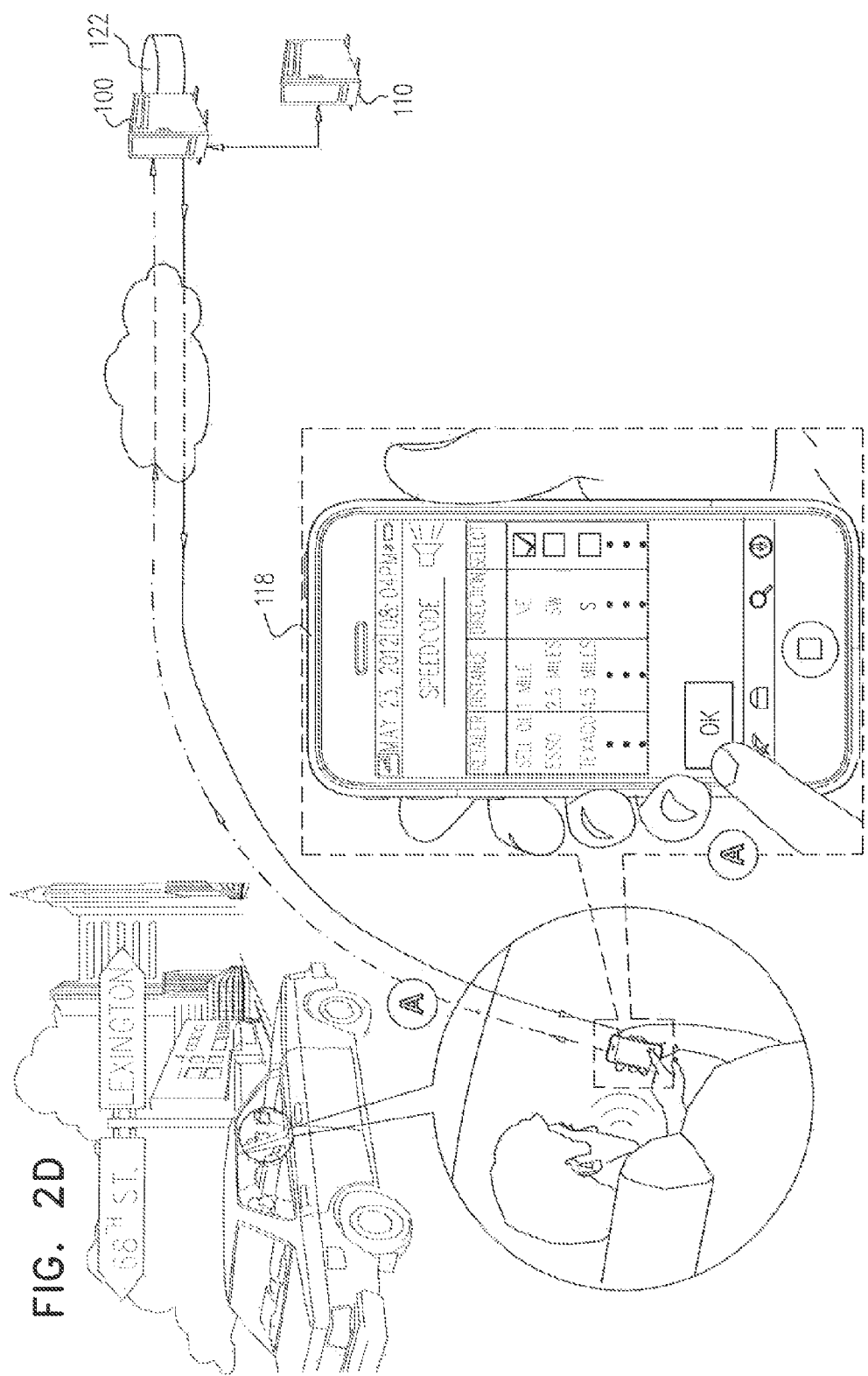
Figure 2F:
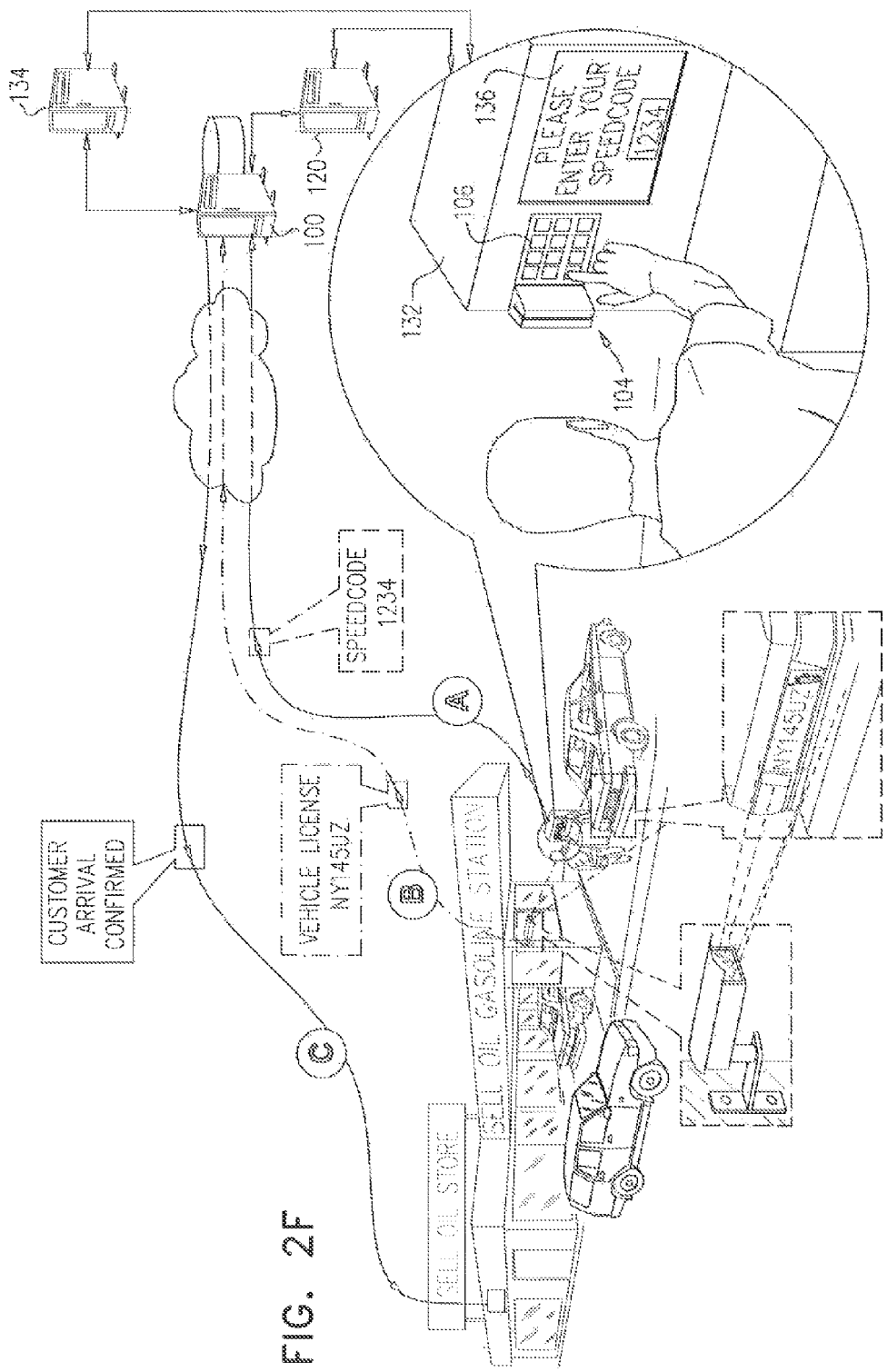
Figure 2G:
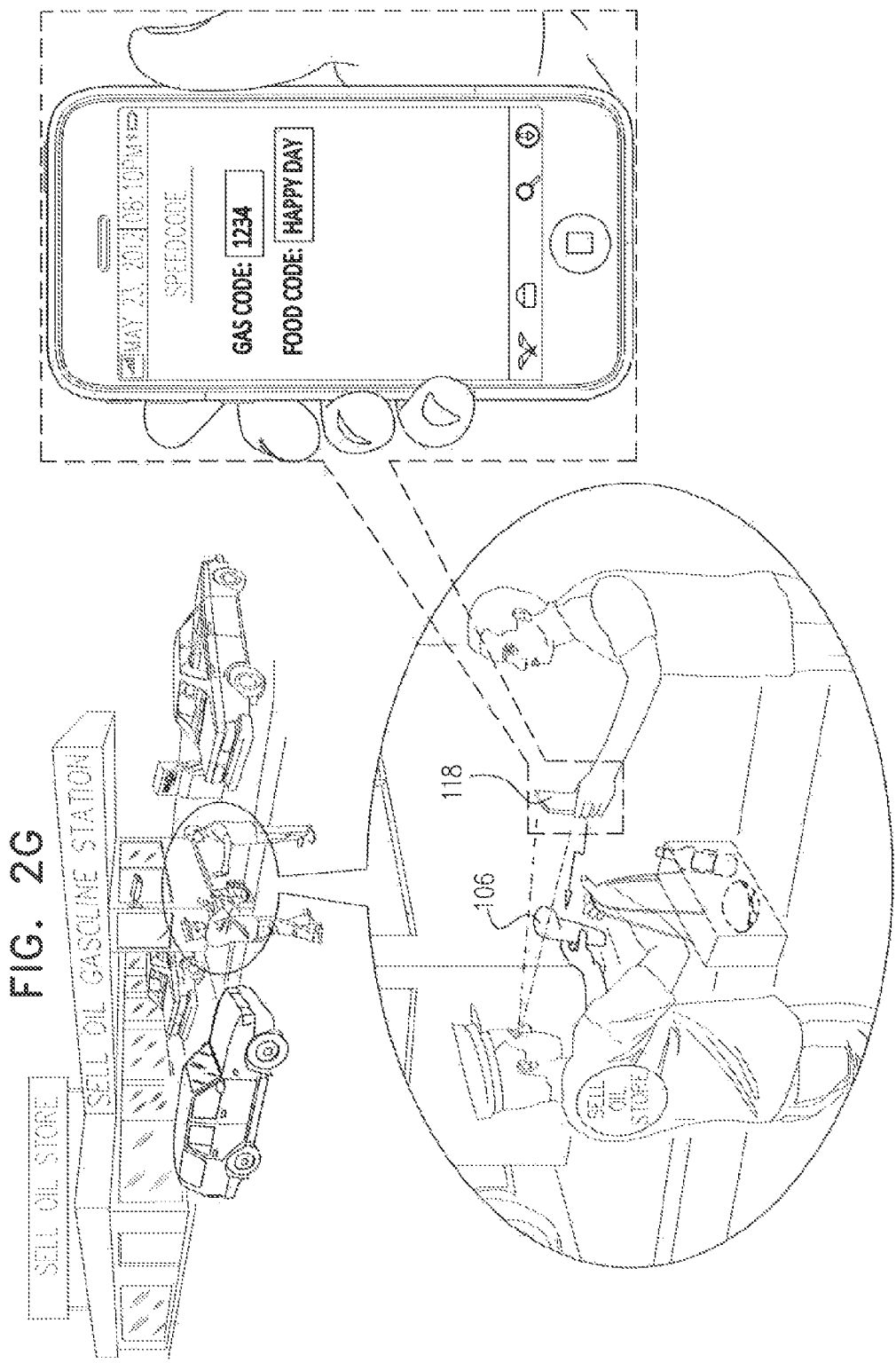
Figure 3A:
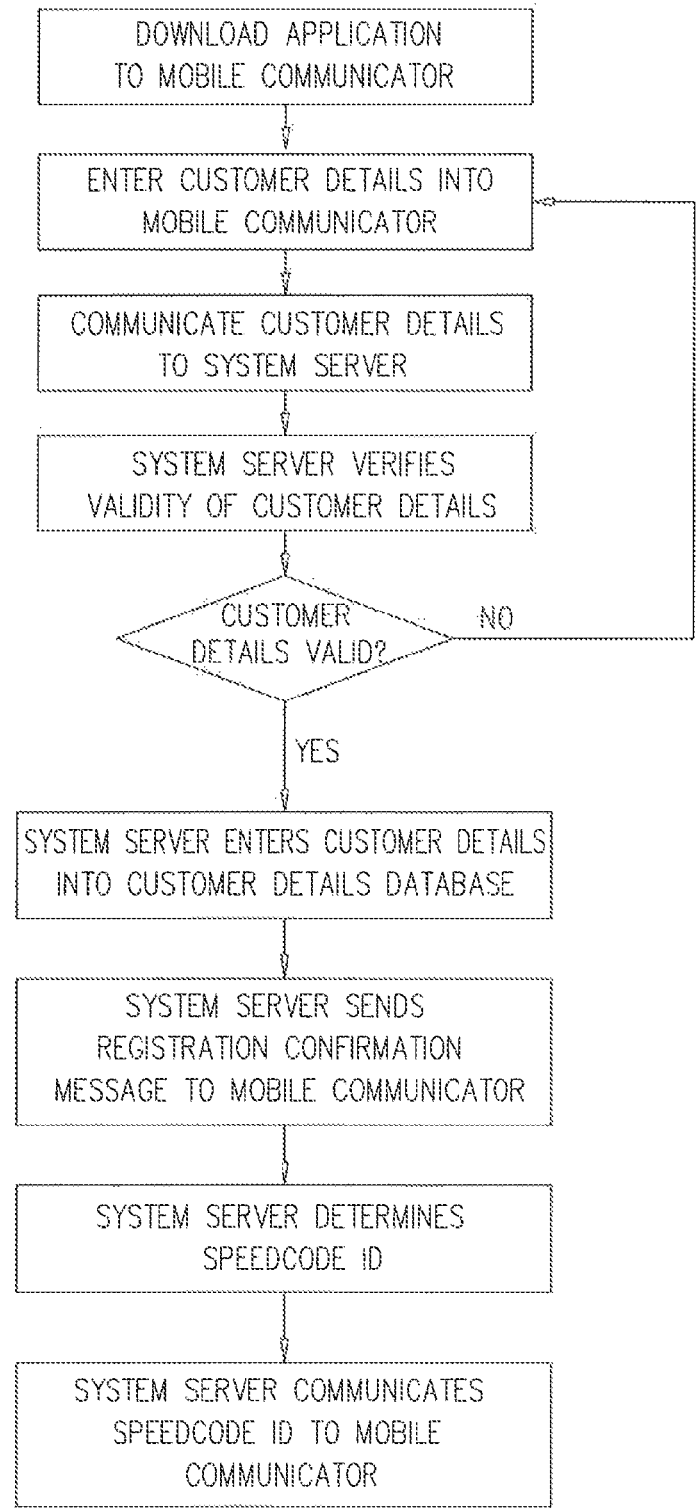
Figure 3B:
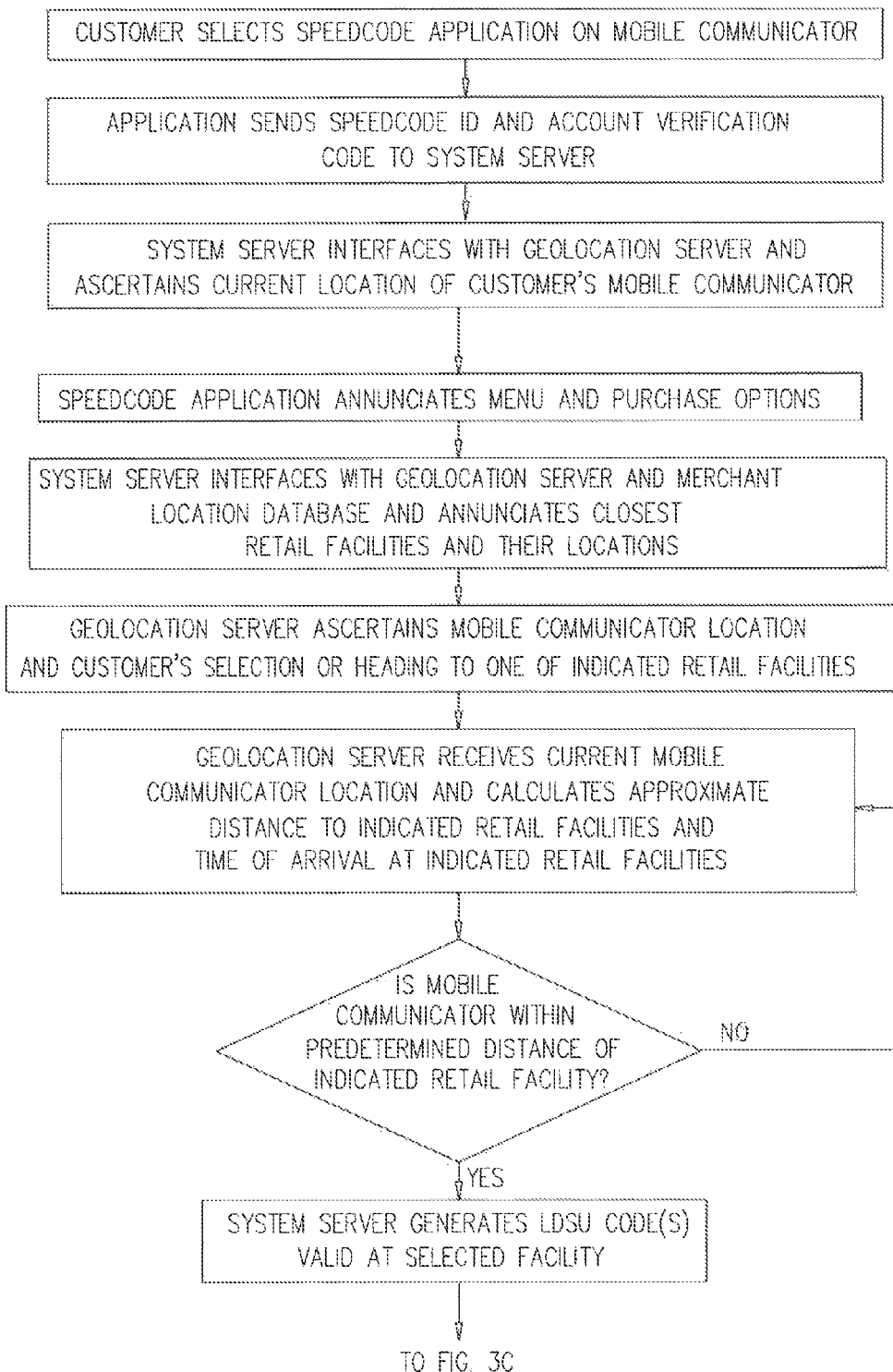

Reference is now made to FIGS. 2A-2G, which are together a simplified illustration of the structure and operation of a payment system constructed and operative in accordance with a preferred embodiment of the present invention, such as that shown in FIG. 1, and to FIGS. 3A-3C, which are together a simplified flowchart illustrating operation of the methodology of a preferred embodiment of the present invention.

Turning to FIGS. 2A and 3A, it is seen that a customer who wishes to use the payment system of an embodiment of the present invention, here termed "SPEEDCODE", may initially register using his mobile communicator 118 via wireless link, such as a cellular telephone link, communicating with the system server 100.

Typically, the customer enters the following personal information via a template which appears on the display of his mobile communicator 118: name, address, payment account information, vehicle license plate number and mobile communicator number and transmits this information via the wireless link to system server 100, as indicated at A in FIG. 2A. Normally, within a few minutes, the customer receives, as indicated at B in FIG. 2A, a confirmation of his SPEEDCODE registration together with a SPEEDCODE ID, typically the customer's mobile telephone number.

As seen particularly in FIG. 3A, customer registration applications are preferably made available by the system server 100 either directly to a customer computer or mobile communicator 118, via a suitable website or via a marketplace such as the Apple App Store or the Android Playstore. Download of this application provides an opportunity for a customer to enter his relevant customer details, preferably including name, mobile telephone number, address, payment account information, such as credit card, PAYPAL® or bank account number, vehicle license plate number, vehicle gasoline preference, purchase limits, if any. Upon completion, customer details are communicated to system server 100.

System server 100 verifies validity of the customer details and upon verification enters the customer details into customer details database 126 (FIG. 1). The system server 100 preferably sends a registration confirmation message to the mobile communicator 118 of the customer.

The system server 100 determines a customer identifier, which may be, for example, the mobile telephone number of the customer or any other available string selected by the customer, and preferably communicates it to the customer's mobile communicator 118. The customer identifier, here termed also "SPEEDCODE ID," is preferably confirmed to the customer via the display of the mobile communicator 118. As seen particularly in FIG. 2A, the registration confirmation message and SPEEDCODE ID are preferably communicated from system server 100 to the mobile communicator 118 in a single communication.

Turning to FIGS. 2B and 3B, it is seen that a customer, wishing to use the virtual payment system of the present invention, preferably selects the SPEEDCODE application by touching a suitable icon on his mobile communicator 118 and preferably confirms that selection by a further customer action. The application preferably automatically sends the SPEEDCODE ID from the mobile communicator 118 to the system server 100 and may also send an account verification code, which may be selected by the customer and may be provided as part of a wallet application. The system server 100 verifies the SPEEDCODE ID and preferably ascertains the current location of the customer, preferably by interaction between the mobile communicator 118 and the geolocation server 110.

Turning now to FIG. 2C, it is seen that the SPEEDCODE application preferably annunciates to the customer, via the customer's mobile communicator 118, in an audio and/or visually sensible manner, a menu which enables the customer to make purchase selections. For example, the customer may indicate that he wishes to purchase gasoline and food and may specify which food he wishes to purchase. The customer's purchase selections are communicated to the system server 100.

Turning now to FIG. 2D, it is seen that the system server 100, interfacing with the geolocation server 110 and one or more merchant location databases 122, ascertains and then annunciates to the customer, via the customer's mobile communicator 118, the locations and identifying details, including one or more unambiguous merchant identifiers, of a plurality of fixed locations 113 which include retail facilities offering both food and gasoline. These fixed locations 113 are typically at various distances and in various directions from the current location of the customer.

The customer may indicate his selection of one or more of the retail facilities at a selected fixed location 113 of the fixed locations 113 annunciated, in which case, driving directions or walking instructions may be automatically provided to the customer via the customer's mobile communicator 118.

Alternatively, the customer need not communicate a selection of a retail facility explicitly but may begin driving or walking in a direction which indicates that he is heading for one of the indicated retail facilities. Preferably, once the geolocation server 110 ascertains unambiguously that the customer is headed for a specific one of the indicated retail facilities, it may request a confirmation from the customer, via the customer's mobile communicator, that the customer does wish to purchase gasoline and/or the selected food at the retail facility that he appears to be headed for. Alternatively, no such confirmation is requested.

Turning now to FIG. 2E, it is seen that in accordance with a preferred embodiment of the present invention, once the customer is within a predetermined propinquity of the selected retail facility, typically 1000 feet, the following occurs:

The system server 100 generates and communicates to the customer's mobile communicator 118 a limited duration, single use purchase/payment (LDSU) code. In accordance with one embodiment of the invention, the LDSU code is preferably easily remembered by the customer and thus can be readily presented by the customer at a point of sale. In such a case, the LDSU code may be annunciated to the customer, preferably via the customer's mobile communicator 118. The annunciation may be oral and/or visual. Alternatively, the LDSU code may be designed to be communicated, such as via NFC, BLUETOOTH and/or WIFI via the customer's mobile communicator 118 directly to a POS device 104 and thus need not be easily remembered by a customer or even annunciciated to the customer.

If more than one merchant identifier is present at the selected retail facility or selected fixed location 113, multiple LDSU codes may be provided, as seen in FIG. 2E. For example, if gasoline and food are sold by a merchant identified by a single merchant identifier, a single LDSU code may be employed, however if instead the gasoline sales and the food sales are controlled by separate entities, having separate merchant identifiers, as seen in FIG. 2E, multiple LDSU codes may be employed. The LDSU code may be a series of numbers and/or other symbols, including phrases.

The LDSU code is preferably valid for a short period of time, normally denominated in minutes, sufficient to allow the customer to reach the retail facility and complete the fuel dispensing and/or purchase activity. After the limited duration, the code expires and can no longer be used for a transaction. Once the code is used, it expires. The duration may be a function of the sensed propinquity, in terms of time or distance of the customer from the retail facility at the time of LDSU code generation.

The LDSU code may be valid at a single retail facility or alternatively at multiple retail facilities.

It is appreciated that system server 100 may communicate the LDSU code to the customer's mobile communicator 118 immediately after LDSU generation.

Turning now to FIG. 3C, it is seen that the system server 100 may send a message to the selected retail facility, preferably via the POS operating server 130, and alternatively via a merchant server, or directly via a POS device, placing an order for the selected food, to enable it to be prepared for delivery prior to arrival of the customer at the retail facility. This message preferably indicates the estimated arrival time of the customer at the retail facility.

As seen in FIG. 2F, arrival of the customer vehicle at the retail facility may be sensed via GPS or by reading the customer's vehicle license plate by a reader interfacing with the a fuel dispenser operating server 134 and with system server 100. In the latter case, the vehicle's license plate may be recognized as corresponding to a registered SPEEDCODE customer who has indicated his wish to purchase gasoline within the limited duration established by the LDSU code and a specific fuel dispenser adjacent which the vehicle is located may provide a customer specific message to the customer, inviting the customer to display or otherwise enter the LDSU code. A message may be communicated from system server 100 to the POS/ECR operating server 130 notifying the arrival of the customer to the adjacent gasoline station, In either case, the customer is invited to display or otherwise enter the LDSU code. This may be done, for example, using a customer interface device 136, such as a keyboard or keypad, camera or NFC device, as by placing the display of the customer's mobile communicator 118 in front of a camera or by using NFC communication.

If no licensed plate recognition is provided, the customer may select payment via SPEEDCODE and then proceed to enter his LDSU code.

Preferably, while the customer is present at the selected the retail facility, the LDSU code is either displayed or readily displayable or otherwise annunciatable by the customer's mobile communicator 118.

Upon entry of the LDSU code in any of the foregoing ways, following received LDSU validity verification by system server 100 or by one of a POS device, a merchant server and a POS operating server 130 at the retail facility, a fuel dispenser 132 is enabled to dispense the type of fuel that was indicated by the customer upon registration and a POS device 104. The fuel dispenser 132 is automatically operated to interface with the system server 100 to obtain the necessary payment particulars to enable completion of the payment via payment terminal 106 communicating to financial transaction processor servers 120. Alternatively, completion of the payment transaction may be effected by the system server 100, a financial transaction processer server 120 and one or more of a merchant server and POS operating server 130 without involving a payment terminal 106 at the fuel dispenser.

As seen in FIG. 2G, customer's food order is delivered. LDSU is presented to a payment device 106. Non-gasoline purchase transactions may be carried out automatically in a similar manner by the system server 100 either via a POS device 104 located at the store or by payment device 106 or independently thereof by interactions between the system server 100, a financial transaction processer server 120 and one or more of a merchant server and POS operating server 130.

In an alternative system configuration, the geolocation server is obviated. The customer may select a geographical area, for example New York City, from an application menu, and may or may not indicate goods or services to be purchased, for example, SELL OIL Gasoline. An LDSU code valid for a predetermined limited time duration, for example, 10 minutes, is generated by system server 100 and communicated to the customer's mobile communicator 118 as well as to all SELL OIL retail facilities within New York City. The customer may purchase gasoline or possible other products or services from any SELL OIL retail facilities in New York City during the validity of the LDSU code in the manner described hereinabove.

It will be appreciated by persons skilled in the art that the present invention is not limited by what has been particularly shown and described hereinabove. Rather the scope of the present invention includes both combinations and subcombinations of the various features described hereinabove as well as modifications thereof which are not in the prior art.

The invention claimed is:

1. A remotely-initiated transaction system comprising:
   a customer-specific, merchant location-specific, customer geolocation responsive, limited time duration transaction identifier generator operative to automatically generate, in response to a customer order for at least one specific product, a customer-specific, merchant location-specific, customer geolocation responsive, limited time duration transaction identifier, said limited time duration transaction identifier being valid for a geolocation-determined time duration sufficient to allow a customer to reach a merchant location and complete purchase activity, said geolocation-determined time duration being a function of vehicular travel time between a location of said a-customer at a time of generation of said customer-specific, customer geolocation responsive, limited time duration transaction identifier and said merchant location;
   a customer-specific, merchant location-specific, limited time duration transaction identifier communicator operative to automatically communicate said customer-specific, merchant location-specific, customer geolocation responsive, limited time duration transaction identifier as well as information relating to said merchant location to said customer;
   a limited time duration transaction identifier validator, communicating with a point of sale (POS) device, operative to automatically verify genuineness and timeliness of said customer-specific, merchant location-specific, customer geolocation responsive, limited time duration transaction identifier presented by said customer at said merchant location;
   wherein said customer-specific, merchant location-specific, customer geolocation responsive, limited time duration transaction identifier generator is remotely located from said POS device.

2. The virtual payment system according to claim 1 and wherein said customer-specific, merchant location-specific, customer geolocation responsive, limited time duration transaction identifier is also operative as a purchase identifier.

3. The virtual payment system according to claim 1 and wherein said limited time duration transaction identifier validator is located at said POS device.

4. The virtual payment system according to claim 1 and wherein said limited time duration transaction identifier validator is remotely located from said POS device.

5. The virtual payment system according to claim 1 and wherein said limited time duration transaction identifier is valid at a single point of sale.

* * * * *